United States Patent [19]
Bock et al.

[11] Patent Number: 5,946,111
[45] Date of Patent: Aug. 31, 1999

[54] RASTER OUTPUT SCANNER TO PHOTORECEPTOR MOUNT

[75] Inventors: Edward C. Bock, Macedon; James M. Casella, Webster, both of N.Y.

[73] Assignee: Xerox Corporation, Stamford, Conn.

[21] Appl. No.: 09/211,248

[22] Filed: Dec. 14, 1998

[51] Int. Cl.⁶ ...................................................... H04N 1/40
[52] U.S. Cl. ............................................................ 358/474
[58] Field of Search ..................................... 358/400, 474, 358/473; 348/832, 836; 382/312; 235/22

[56] References Cited

U.S. PATENT DOCUMENTS 3,697,167 10/1972 Hamaker ....................................... 355/8
5,567,925 10/1996 Keoneck ................................. 235/375

Primary Examiner—Jerome Grant, II
Attorney, Agent, or Firm—John M. Kelly

[57] ABSTRACT

A system of mounting a raster output scanner relative to a photoreceptor such that deskewing, focusing, and pitch adjustment of the aerial image are possible. A spring isolated ROS assembly having at least two ROS arms attaches to a backer bar assembly that locates the position of the photoreceptor. The backer bar assembly and the ROS assembly connect at one end using a ball and socket and at the other end using a ball and fork such that the center line of the balls form a scan line plane. The ball and socket form a reference connection at one end. At the ball and socket end the photoreceptor backer bar has a mounting arm that is flexible in one plane but rigid in a perpendicular plane. A deskew mechanism, beneficially a motor driven cam, flexes the backer bar mounting arm as required to deskew the scan line.

8 Claims, 4 Drawing Sheets

RASTER OUTPUT SCANNER TO PHOTORECEPTOR MOUNT

FIELD OF THE INVENTION

This invention is directed towards an improved system for mounting a raster output scanner in an imaging relationship with a photoreceptor.

BACKGROUND OF THE INVENTION

Electrophotographic marking is a well-known method of copying or printing documents. Electrophotographic marking is performed by exposing a light image representation of a desired final image onto a substantially uniformly charged photoreceptor. In response to that light image the photoreceptor discharges to produce an electrostatic latent image of the desired image on the photoreceptor's surface. Toner particles are then deposited onto that latent image so as to form a toner image. That toner image is then transferred from the photoreceptor onto a substrate such as a sheet of paper. The transferred toner image is then fused to the substrate, usually using heat and/or pressure, to produce the desired document. The surface of the photoreceptor is then cleaned of residual developing material and recharged in preparation for the production of another document.

The foregoing broadly describes a black and white electrophotographic printing machine. Electrophotographic marking can also produce color images by repeating the above process each color of toner that is used to make the composite color image. By placing the various colors of toner in a superimposed registration a desired composite color image results.

One way of exposing the photoreceptor is to use a Raster Output Scanner (ROS). A ROS is comprised of a laser light source (or sources) and a rotating polygon having a plurality of mirrored facets. The light source radiates a laser beam onto the polygon facets. That beam reflects from the facets and strikes the photoreceptor, producing a light spot. As the polygon rotates the spot traces lines, referred to as scan lines, on the photoreceptor. The direction of the sweeping spot is called the fast scan direction. By moving the photoreceptor perpendicular to the fast scan direction, as the polygon rotates the spot raster scans the photoreceptor. The direction of motion of the photoreceptor is referred to either as the slow scan direction or the process direction. During scanning, the laser beam is modulated to produce the desired latent image.

The position of the raster output scanner relative to the photoreceptor is very important. Typically, a raster output scanner is located within a special housing that attenuates noise from the rotating polygon and that prevents paper fibers, toner, and other debris from contaminating the optical components. That housing is positioned within a machine frame such that the laser beam that emerges from a housing window is directed along a scan plane. Ideally, that scan plan is perpendicular to the direction of motion of the photoreceptor. Scan lines that are not perpendicular to the direction of motion of the photoreceptor are referred to as being skewed. Furthermore, the aerial image formed by the laser beam on the photoreceptor should be properly focused. While positioning the raster output scanner relative to the photoreceptor is difficult in black only printing, when color printing using multiple raster output scanners proper positioning of the raster output scanners relative to the photoreceptor or photoreceptors becomes even more difficult. Not only must multiple raster output scanners be positioned and mounted, but also the eye's sensitivity to color imperfections mandate tight positioning tolerances.

In addition to initially positioning the raster output scanner relative to the photoreceptor, it is important that the position remains correct over time. For example, vibrations within the machine and photoreceptor motion, particularly when using a belt photoreceptor, must not cause positioning problems.

It is therefore one object of the invention to provide a system for mounting a raster output scanner relative to a photoreceptor such that the relative positioning of the elements meet tight imaging tolerances.

SUMMARY OF THE INVENTION

The present invention provides for a system of mounting a raster output scanner relative to a photoreceptor such that deskewing, focusing, and pitch adjustment of the aerial image, together with simple separation and realignment of the raster output scanner and the photoreceptor, are possible. In accordance with the principles of the present invention, a spring isolated ROS assembly having at least two ROS arms latches to a backer bar. The photoreceptor itself passes over the backer bar. Therefore, accurately locating the ROS assembly relative to the backer bar accurately locates the ROS relative to the photoreceptor. The backer bar and the ROS arms beneficially connect at one end using a ball and socket and at the other end using a ball and fork such that the center line of the balls form a scan line plane. The ball and socket form a rigid reference connection at one end. At the ball and socket end the backer bar has a mounting arm that is flexible in one plane but rigid in a perpendicular plane. A deskew mechanism, beneficially a motor driven cam, flexes the backer bar mounting arm as required to deskew the scan line.

The ROS assembly itself is spring mounted to a machine frame in three place. A vertical spring supports the ROS assembly vertically. Two tensioning springs, one at each ROS arm, bias the ROS assembly toward the photoreceptor's normal operating position. Beneficially, the ROS assembly and the photoreceptor are mounted such that they can separate. When realigning the ROS assembly to the photoreceptor, the ball and socket mate and ball and fork mate. The spring-loaded ROS assembly then floats to complete the mating. The length of the ROS arm at the ball and fork end is made adjustable to provide for proper focusing.

BRIEF DESCRIPTION OF THE DRAWINGS

Other aspects of the present invention will become apparent as the following description proceeds and upon reference to.

DESCRIPTION OF THE INVENTION

Figure 4:
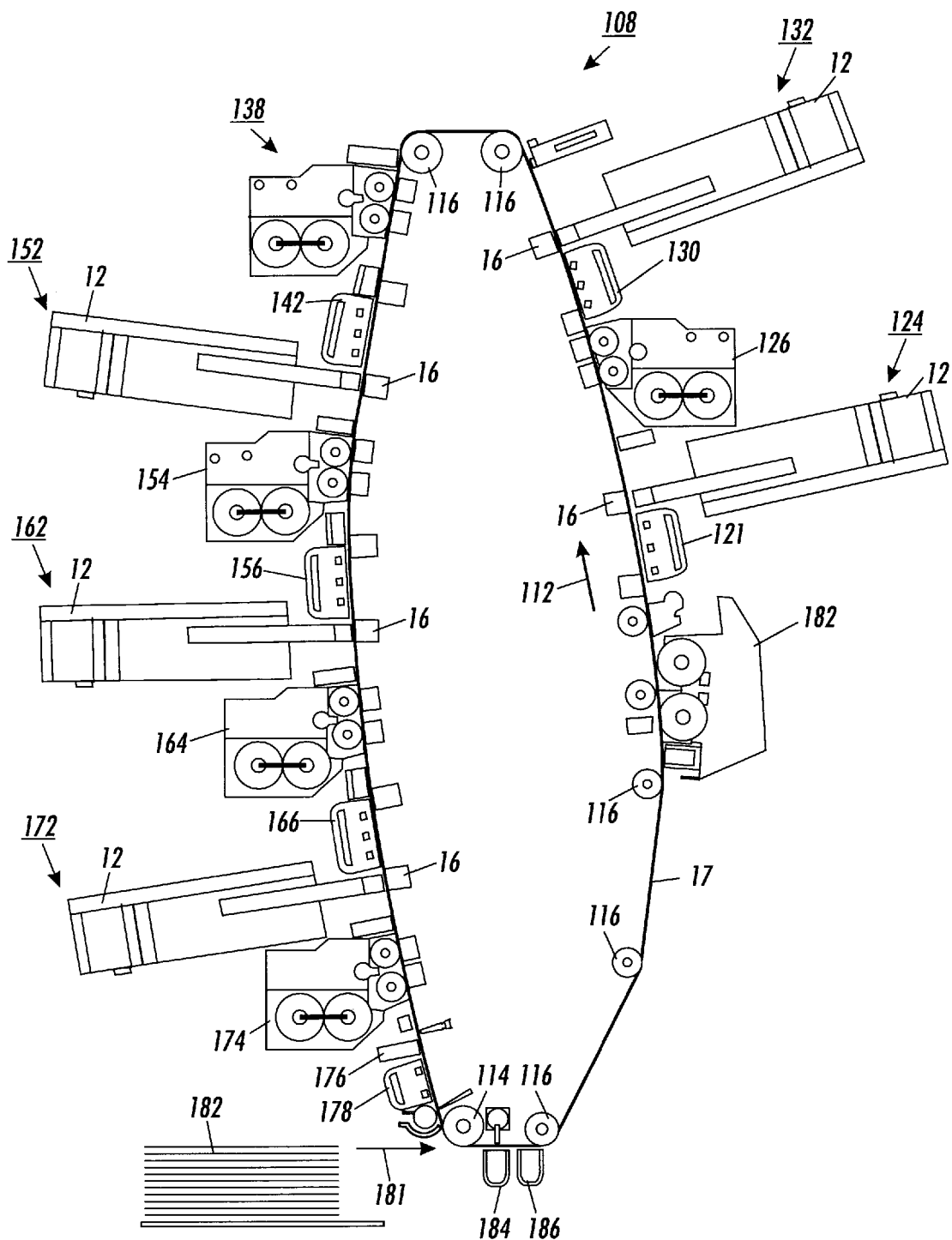
FIG. 4 shows an electrophotographic printing machine that incorporates the principles of the present invention.

While the principles of the present invention will be described in connection with a preferred embodiment of the invention, it should be understood that the present invention is not limited to that embodiment. Indeed, the illustrated embodiment is exemplary only. Therefore, is should be understood that the present invention extends to all alternatives, modifications and equivalents as may be included within the spirit and scope of the appended claims. Furthermore, since electrophotographic printing is well known, the various stations employed in a printing machine illustrated in FIG. 4 are shown only schematically and their operation described only briefly.

Figure 1:
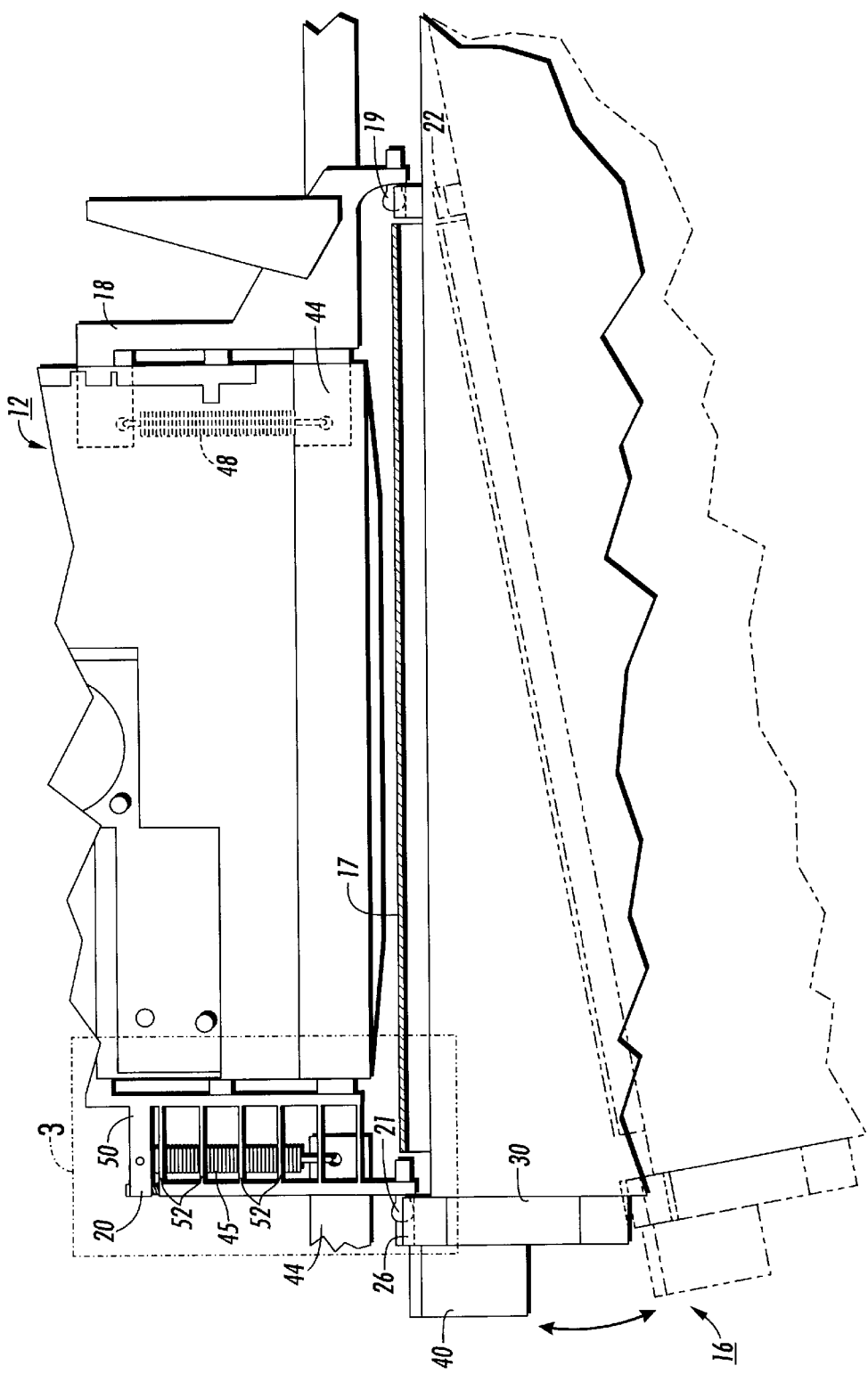
FIG. 1 shows a partial top view of a ROS assembly mounted to a backer bar assembly according to the principle of the present invention.

Turning now to FIG. 1, the principles of the present invention are directed to mounting a raster output scanner (ROS) assembly 12 and a backer bar assembly 16 such that scan lines from a raster output scanner within the ROS assembly properly scan across a photoreceptor 17 that moves in front of the backer bar assembly. A properly scanned scan line is well focused, produces a constant spot size, is perpendicular to the motion of the photoreceptor, and, if used in a color printer, is registered with other scan lines.

As shown in FIG. 1, the ROS housing 12 includes at one end a fixed arm 18 that ends in a ball 19 and at the other end a flexible arm 20 that ends in a ball. The ball 19 mates with a socket 22 of the backer bar assembly 16 while the ball 21 mates with a fork 26 of the backer bar assembly 16 (also see FIG. 2). The balls, socket, and fork are the mating interfaces between the ROS assembly 12 and the backer bar assembly 16. As shown in dashed lines in FIG. 1, the backer bar assembly 16 is mounted (on a door that is not shown) such that it can pivot away from the ROS assembly 12. Pivoting enables relatively easy access to various machine elements, such as those discussed below.

When the backer bar assembly 16 first contacts the ROS assembly the ball 19/socket 22 mate. The ball 19 end of the ROS assembly then moves both vertically and horizontally as required to enable the ball 19 to seat in the socket 22. As the backer bar assembly 16 continues to approach the ROS assembly the ball 21 seats in the fork 26. The ball 21 end of the ROS assembly then moves both vertically and horizontally as required to enable the ball 21 to seat in the fork 26. The mechanisms that enable the ROS assembly to move as required are explained subsequently.

Figure 2:
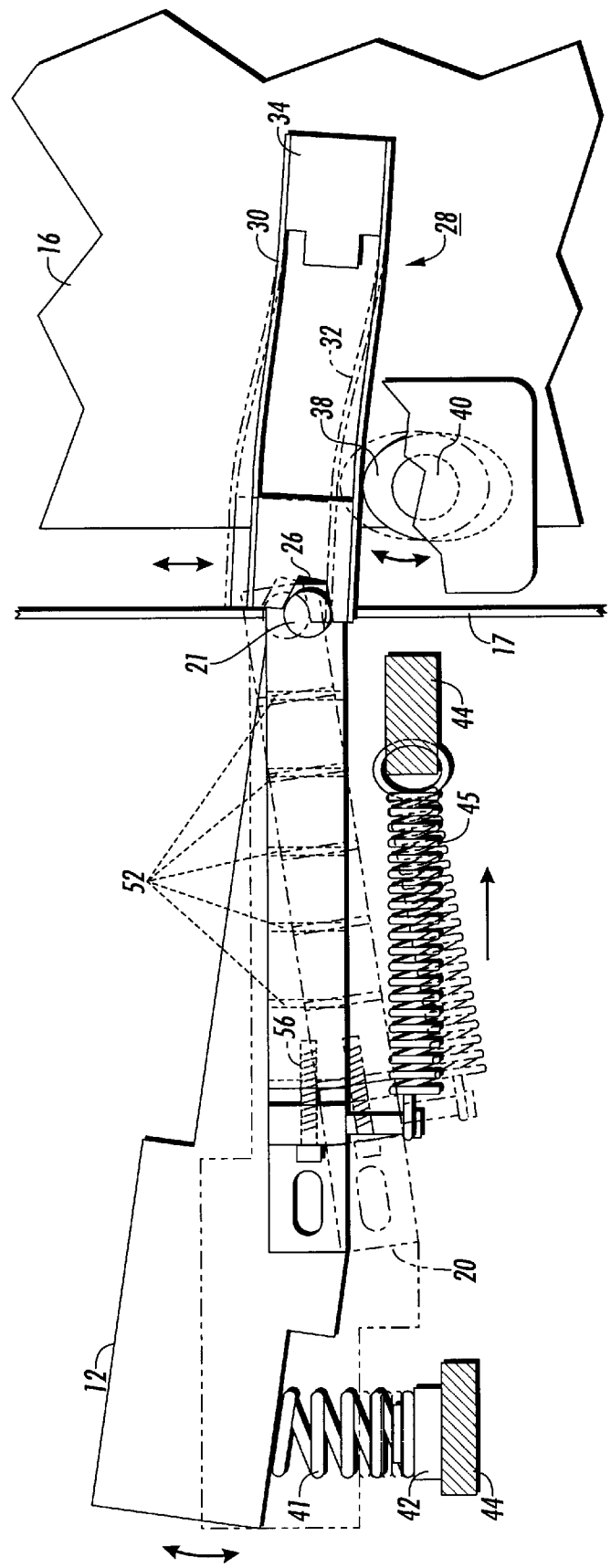
FIG. 2 shows a partial left side view of the ROS assembly and the backer bar assembly shown in FIG. 1.

Turning now to FIG. 2, the fork 26 is at the end of a flexible arm assembly 28 that has two thin, but wide, flexure arms 30 and 32. The flexible arm assembly 28 flexes only in one direction (vertically in FIG. 2). The flexure arms terminate at one end at the fork 26 and at the other end to a mount 34 that is rigidly attached to the photoreceptor assembly 16 (and thus to the machine door). The flexible arm assembly 28 is flexed by a cam 38 that is turned by a motor 40. The flex of the flexible arm, and thus the vertical position of the fork and the ball 21 end of the ROS assembly, is controlled by the cam 38. After considering how the ROS assembly 12 and the backer bar assembly 16 meet it can be understood that the angle between the scan line and the direction of motion of a photoreceptor 17 is controlled by the cam. If the cam flexes the flexible arm assembly the fork 26 moves, which pivots the ROS assembly 12, causing the scan line angle to change. The result is a deskew adjustment. Since the deskew adjustment is unlikely to change once it is properly set-up, the cam position will normally be adjusted only after an event that disturbs the deskew adjustment occurs, such as replacement of the photoreceptor.

Still referring to FIG. 2, the freedom of motion of the ROS assembly 12 to move as required to mate the ball 19 with the socket 22 and to mate the ball 21 with the fork 26 is a result of spring mounting the ROS assembly within the frame. The rear end of the ROS assembly 12 is vertically supported by a spring 41. That spring terminates at one end at a mount 42 that attaches to a machine frame 44. The spring 40 not only vertically supports the ROS assembly 12, but also enables the ROS assembly to move horizontally.

The ROS assembly 12 is biased (forward in FIG. 2) by a spring 45 (shown in FIGS. 1, 2, and 3) at the ball 21 end of the ROS assembly and by a spring 48 (shown only in FIG. 1) at the ball 19 end of the ROS assembly. The spring 45 attaches to the flexible arm 20 and to the machine frame 44. The spring 45 biases the ball 21 end of the ROS assembly toward the photoreceptor assembly 16. Likewise, the spring 48 attaches to the fixed arm 18 and to the machine frame 44 such that spring 48 biases the ball 19 end toward the photoreceptor assembly 16. Therefore, when the ball 19/socket 22 and the ball 21/fork 26 mate, the biases of springs 46 and 48 force the balls into their mates. Since the front end of the ROS assembly moves freely, the ROS assembly mates with the backer bar assembly as previously discussed.

Figure 3:
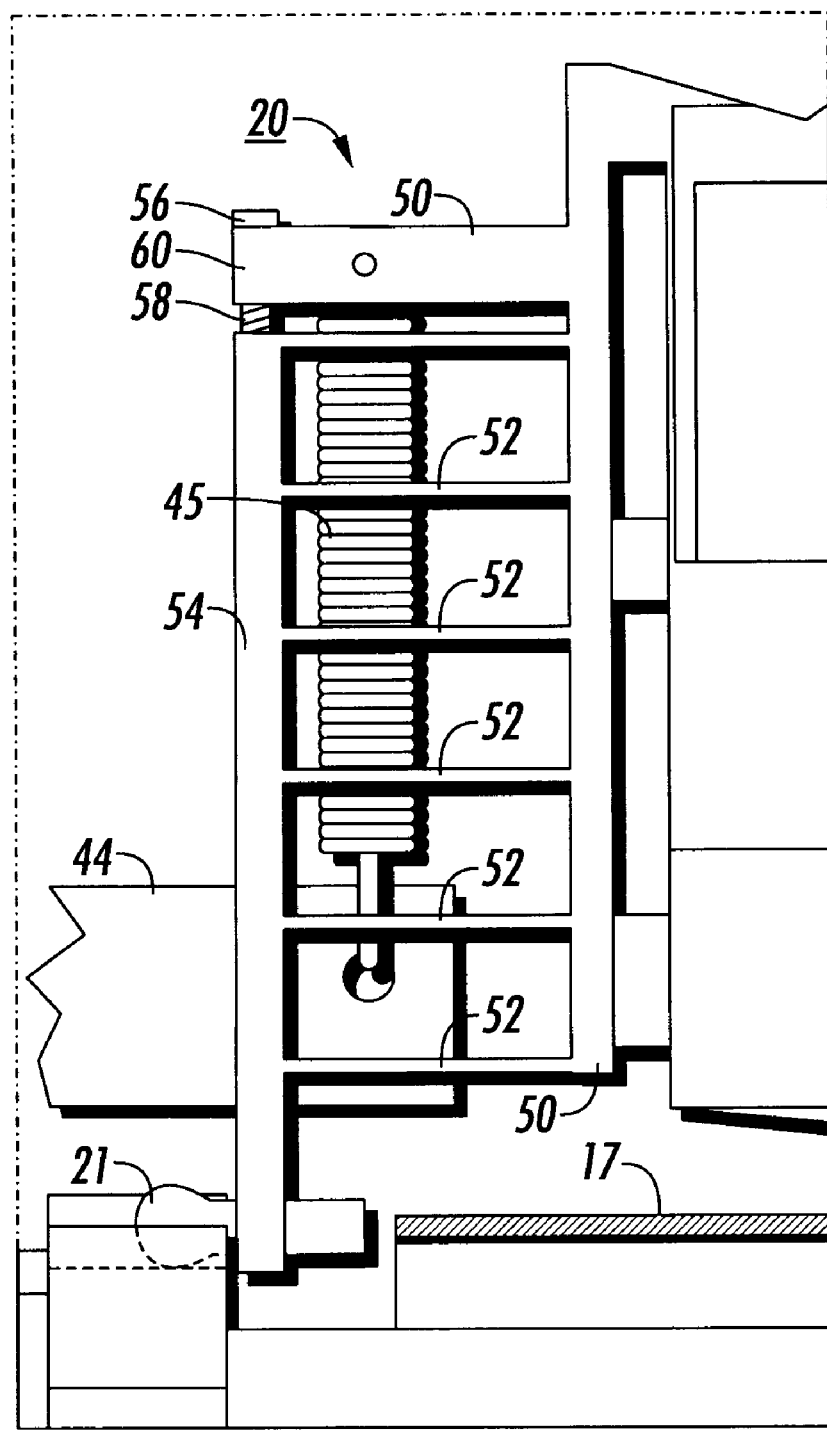
FIG. 3 shows an enlarged view of part of FIG. 1.

Referring now specifically to FIG. 3, the flexible arm assembly 20 is constructed of a rigid arm 50 and a series of thin, wide flex members 52 (also see FIGS. 1 and 2). The flex members terminate at one end at the rigid arm 50 and at the other end at an adjustment plate 54. The adjustment plate has the ball 21 at one end and a contact surface 58 at the other. The rigid arm 50 includes an arm section 60 that has a screw hole for an adjustment screw 56. The adjustment screw 56 contacts the contact surface of the adjustment plate 58. By turning the screw 56 the effective length of the flexible arm 20 can be varied while the flex members 52 bias the adjustment plate 54 toward the screw 56. This enables the ball 21 end of the ROS assembly 12 to move either towards or away from the backer bar assembly 16 when the ROS assembly and backer bar assembly are mated.

The rigid arm 18 positions the ball 19 end of the ROS assembly a fixed distance from the backer bar assembly 16 (and thus the photoreceptor 17). The flexible arm 20 can adjust the distance between the ball 21 end of the ROS assembly and the backer bar assembly. Therefore, by properly locating the ROS within the ROS housing such that the laser beam is properly focused at the ball 19 end of the photoreceptor, and by properly adjusting the effective length of the flexible arm 20, the ROS can be properly focused relative to the photoreceptor.

The net result is a raster output scanner that is can be properly aligned with a photoreceptor, wherein the raster output scanner and photoreceptor can be separated and re-mated as required. The ball-socket and ball-fork attachments, combined with the spring mounting and forward bias of the ROS assembly enable easy mating and separation of the ROS assembly 12 and the backer bar assembly 16. The flexure arm 30 and cam 38 enable accurate deskewing of the scan lines produced on the photoreceptor. The adjustment screw 56/flex members 52/adjustment plate 54 enable accurately locating the ball 21 end and the ball 19 end of the ROS the proper distance from a photoreceptor 17. This enables a single focus adjustment within the raster output scanner to accurately focus the resulting spot size at both ends of the photoreceptor (keystone adjustment).

The illustrated ROS assembly 12—backer bar assembly 16 mounting is particularly beneficial when color printing. For example, FIG. 4 illustrates a color printing machine 108 that is suitable for incorporating the principles of the present invention. The printing machine 108 includes an Active Matrix (AMAT) photoreceptor belt 17 which travels in the direction indicated by the arrow 112. Belt travel is brought about by mounting the photoreceptor belt about a drive roller 114 and various tension rollers 116. The drive roller 114 is rotated by a motor that is not shown.

As the photoreceptor belt travels each part of it passes through each of the subsequently described process stations.

For convenience, a single section of the photoreceptor belt, referred to as the image area, is identified. The image area is that part of the photoreceptor belt which is to receive the various actions and toner layers that produce the final composite color image. While the photoreceptor belt may have numerous image areas, since each image area is processed in the same way a description of the processing of one image area suffices to explain the operation of the printing machine 108.

The imaging process begins with the image area passing a charging station 121 that charges the image area in preparation for exposure to create a latent image for a special user defined toner. For example, the charging device might charge the image area to a substantially uniform potential of about −500 volts. It should be understood that the actual charge placed on the photoreceptor is dependent upon many variables, such as the toner that is to be developed and the settings of the subsequent development station (see below).

After passing the charging station the image area advances to a first raster output scanner based exposure station 124. The exposure station 124 is mounted within a ROS assembly 12 as shown in FIGS. 1–3. That ROS assembly mates with a backer bar assembly 16, also as shown in FIGS. 1–3. The photoreceptor 17 passes between the ROS assembly and the backer bar assembly and contacts the backer bar assembly. The various adjustments discussed above are used to properly align and focus the raster output scan line on the photoreceptor. The exposure station exposes the charged image area such that an electrostatic latent representation of a special user defined color image is produced. For example, the exposed portions of the image area might be reduced in potential to −50 V (while the unexposed portions remain at −500 V).

After passing the exposure station 124 the now exposed image area with its latent image passes a development station 126 that deposits special user defined color toner onto the image area. Electrostatic charges cause that toner to adhere to the exposed areas of the image area.

After passing the development station 126 the image area advances to a recharging station 130. The recharging station recharges the image area and its special user defined color toner layer using a technique known as split recharging. Split recharging is described in U.S. Pat. No. 5,600,430, which issued on Feb. 4, 1997, and which is entitled, "Split Recharge Method and Apparatus for Color Image Formation."

The now recharged image area then advances to a second raster output scanner based station 132 that exposes the charged image area such that an electrostatic latent representation of a black image is produced. The exposure station 132 is also mounted within a ROS assembly 12 that mates with a backer bar assembly 16 as shown in FIGS. 1–3. Again, the photoreceptor 17 passes between the ROS assembly and the backer bar assembly and contacts the backer bar assembly. The various adjustments discussed above are used to properly align and focus the raster output scan line on the photoreceptor and such that the scan lines from the exposure station 132 are aligned with the scan lines produced by the exposure station 124. The re-exposed image area then advances to a black development station 138 that deposits black toner onto the re-exposed image area.

After passing the black development station the image area advances to a recharging station 142 that recharges the image area. The now recharged image area with its special user defined toner layer and black toner layer is then exposed by a third raster output scanner based exposure station 152 that exposes the charged image area such that an electrostatic latent representation of a yellow image is produced. The exposure station 152 is also mounted within a ROS assembly 12 that mates with a backer bar assembly 16 as shown in FIGS. 1–3. Again, the photoreceptor 17 passes between the ROS assembly and the backer bar assembly and contacts the backer bar assembly. The various adjustments discussed above are used to properly align and focus the raster output scan line on the photoreceptor such that the scan lines from the exposure station 152 are aligned with the scan lines produced by the exposure stations 124 and 132. The re-exposed image area then advances to a yellow development station 154 that deposits yellow toner onto the re-exposed image area.

After passing the yellow development station the image area advances to a recharging station 156 that recharges the image area. The now recharged image area with its special user defined, black, and yellow toner layers is then exposed by a fourth raster output scanner based exposure station 162. That exposure station exposes the charged image area such that an electrostatic latent representation of a magenta image is produced. The exposure station 162 is also mounted within a ROS assembly 12 that mates with a backer bar assembly 16 as shown in FIGS. 1–3. Again, the photoreceptor 17 passes between the ROS assembly and the backer bar assembly and contacts the backer bar assembly. The various adjustments discussed above are used to properly align and focus the raster output scan line on the photoreceptor such that the scan lines from the exposure station 162 are aligned with the scan lines produced by the exposure stations 124, 132, and 152. The re-exposed image area then advances to a magenta development station 164 that deposits magenta toner onto the re-exposed image area.

After passing the magenta development station the image area advances to a recharging station 166 that recharges the image area. The now recharged image area with its special user defined, black, yellow, and magenta toner layers is then exposed by a fifth raster output scanner based exposure station 172. That exposure station exposes the charged image area such that an electrostatic latent representation of a cyan image is produced. The exposure station 172 is also mounted within a ROS assembly that mates with a backer bar assembly as shown in FIGS. 1–3. Again, the photoreceptor 17 passes between the ROS assembly 12 and the backer bar assembly 16 and contacts the backer bar assembly. The various adjustments discussed above are used to properly align and focus the raster output scan line on the photoreceptor such that the scan lines from the exposure station 172 are aligned with the scan lines produced by the exposure stations 124, 132, 152, and 163. The re-exposed image area then advances to a cyan development station 174 that deposits cyan toner onto the re-exposed image area.

At this time up to five toner layers might be on the image area, resulting in a final, composite color image. However, that composite color image is comprised of individual toner particles that have charge potentials that may vary widely. Directly transferring such a composite toner image onto a substrate would result in a degraded final image. Therefore it is beneficial to prepare the composite color toner image for transfer.

To prepare for transfer a pretransfer erase lamp 176 discharges the image area to produce a relatively low charge level on the image area. The image area then passes a pretransfer DC scorotron 178 that performs a pre-transfer charging function. The image area continues to advance in the direction 112 past the drive roller 114. A substrate 182 moving in the direction 181 is then placed over the image area using a sheet feeder (which is not shown). As the image area and the substrate continue their travels they pass a transfer corotron 184 that applies positive ions onto the back of the substrate 182. Those ions attract the negatively charged toner particles onto the substrate.

As the substrate continues its travel is passes a detack corotron 186. That corotron neutralizes some of the charge on the substrate to assist the separation of the substrate from the photoreceptor 17. As the lip of the substrate 82 moves around the tension roller 18 the lip separates from the photoreceptor. The substrate is then directed into a fuser (that is not shown) where a heated fuser roller and a pressure roller create a nip through which the substrate 182 passes. The combination of pressure and heat at the nip causes the composite color toner image to fuse into the substrate. After fusing, a chute, not shown, guides the substrate to a catch tray, also not shown, for removal by an operator.

While the embodiment disclosed herein is preferred, it will be appreciated that various alternative, modifications, variations or improvements therein may be made by those skilled in the art. All such variations and embodiments are intended to be encompassed by the following claims:

We claim:

1. A mounting, comprising:

a machine housing;

a raster output scanner housing assembly within said machine housing, said raster output scanner assembly having a housing, a rigid arm on a first side of said housing that terminates in a first ball, a flexible arm assembly on a second side of said housing that terminates in a second ball, a first spring attached to said machine housing that biases said rigid arm in a first direction, a second spring attached to said machine housing that biases said flexible arm assembly in said first direction, and a support spring attached to said machine housing that biases said housing in a second direction; and a backer bar assembly within and attached to said machine housing, said backer bar assembly having an arm with a socket at a first end and a bendable arm with a fork at a second end;

wherein said first ball mates with said socket and said second ball mates with said fork such that said first spring biases said first ball toward said socket and second spring biases said second ball toward said fork.

2. The mounting of claim 1, wherein said flexible arm assembly includes a rigid arm, an adjustment plate that terminates in said second ball, a plurality of flex members that connect said rigid arm to said adjustment plate, and an adjustment screw attached to said ridged arm such that said adjustment screw contacts a contact surface of said adjustment plate, wherein turning said adjustment screw changes the effective length of the flexible arm assembly.

3. The mounting of claim 1, further including a motor driven cam capable of bending said bendable arm assembly, thereby moving said fork in a first direction.

4. The mounting of claim 1, wherein said bendable arm assembly is comprised of a fixed mounting block, said fork, and at least two long, thin flex members that are separated by said mounting block at one end and by said fork at a second end.

5. A xerographic printing machine which includes a photoreceptor belt moving in a process direction and over a backer bar, a charging station for charging said photoreceptor belt, an exposure station for exposing said photoreceptor belt with a scanning beam so as to form latent images on a surface of said photoreceptor belt, a developer for developing said latent images, a transfer station for transferring developed images to copy sheets, and a fusing station for fusing transferred images onto said copy sheets, wherein said exposure station comprises at least one Raster Output Scanner (ROS) which generates said scanning beam and which is located within a ROS housing, the improvement comprising a mounting system for mounting the ROS relative to said backer bar, the mounting system comprising:

a xerographic printing machine frame;

a raster output scanner housing assembly within said xerographic printing machine frame, said raster output scanner assembly including said ROS housing, a rigid arm on a first side of said ROS housing that terminates in a first ball, a flexible arm assembly on a second side of said ROS housing that terminates in a second ball, a first spring attached to said xerographic printing machine frame that biases said rigid arm in a first direction, a second spring attached to said xerographic printing machine frame that biases said flexible arm assembly in said first direction, and a support spring attached to said xerographic printing machine frame that biases said ROS housing in a second direction; and a backer bar assembly within and attached to said machine housing, said backer bar assembly including a backer bar, an arm having a socket at a first end of said backer bar and a bendable arm having a fork at a second end of said backer bar;

wherein said first ball mates with said socket and said second ball mates with said fork such that said first spring biases said first ball toward said socket and second spring biases said second ball toward said fork.

6. The xerographic printing machine of claim 5, wherein said flexible arm assembly includes a rigid arm, an adjustment plate that terminates in said second ball, a plurality of flex members that connect said rigid arm to said adjustment plate, and an adjustment screw attached to said ridged arm such that said adjustment screw contacts a contact surface of said adjustment plate, wherein turning said adjustment screw changes the effective length of said flexible arm assembly.

7. The xerographic printing machine of claim 5, further including a motor driven cam for bending said bendable arm assembly, thereby moving said fork in a first direction.

8. The xerographic printing machine of claim 5, wherein said bendable arm assembly is comprised of a fixed mounting block, said fork, and at least two long, thin flex members that are separated by said mounting block at one end and by said fork at a second end.

* * * * *